Nov. 1, 1966    W. B. ANDERSON    3,283,051
BRICKMAKING MACHINE AND PROCESS
Filed July 26, 1963
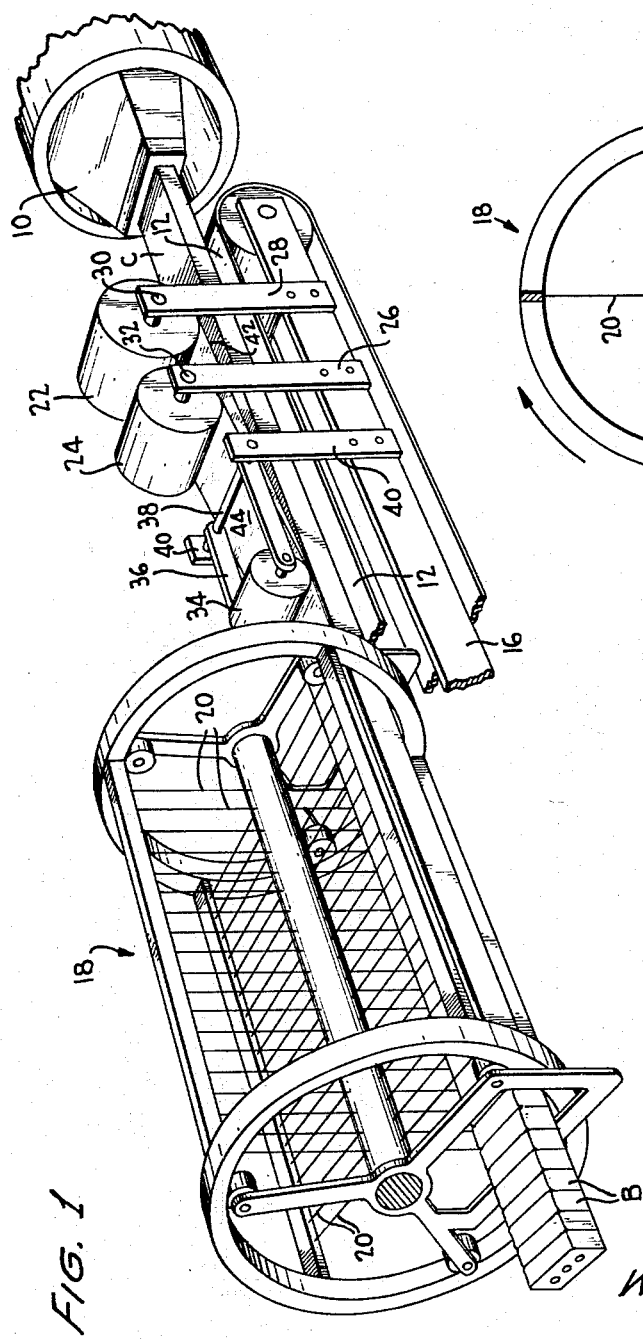
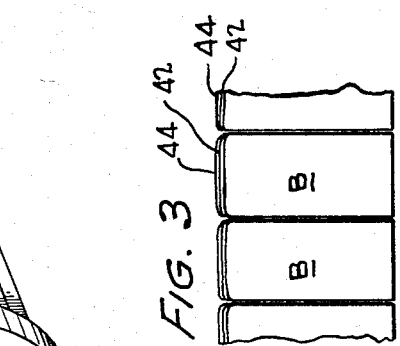
INVENTOR,
WILLIAM B. ANDERSON
BY *Watson, Cole, Grindle & Watson*
ATTORNEYS

# United States Patent Office 3,283,051
Patented Nov. 1, 1966

3,283,051
BRICKMAKING MACHINE AND PROCESS
William B. Anderson, Atlanta, Ga., assignor to Chattahoochee Brick Company, Atlanta, Ga., a corporation of Georgia
Filed July 26, 1963, Ser. No. 297,754
8 Claims. (Cl. 264—148)

This invention relates to a process and mechanism for producing decorative brick.

It is well known that old or used bricks are in much demand for use in residential and other building structures, due to the attractive mellowed appearance which they impart to structures formed from them. One of the principal characteristics of such bricks is the more or less irregular rounding of the corners and edges around the exposed faces thereof. However, the recovery of used bricks for further use, as is well known, involves the tedious task of removing old mortar which adheres to such bricks and this, together with the recovery of the bricks from the original structure, has resulted in such used brick being quite expensive and in limited supply in many areas.

With this in mind it has long been desired to manufacture new bricks which would have the appearance of old bricks, but efforts along this line prior to the present invention have not been fruitful.

With the foregoing in mind, it has been the primary object of the present invention to devise an efficient and economical process for producing new bricks having the appearance, on at least one face, of old bricks as herein above described, as well as to provide machinery for efficiently carrying out such process.

It has further been an object to provide such a brick, one face of which is provided with substantially the appearance of an old brick, while another face thereof has the usual appearance of a new brick, whereby the bricks may be layed as desired to expose either such face. The brick as thus described is also included within the present inventive concept.

In carrying out the invention, there is continuously extruded a horizontal plastic clay column of rectangular cross section, over one flat face of which is continuously applied an overlay of flexible and tearable sheet material such as paper of selected tensile strength. If desired, more than one such thickness or overlay may be applied. Then with the column of clay still in its plastic state, it is severed or divided into a plurality of bricks by pressing a series of parallel blunt edged cutting elements such as cutting wires transversely through this overlay from the side on which the overlay is presented, or in other words in a direction to first engage the overlay and then to drag it partially into and through the column before parting of the overlay. This results in partially irregularly rounding and deforming the edges and corners of the resulting bricks around the particular brick faces which are comprised by segments of the upwardly presented flat face of the column on which the overlay is applied. However, it will be apparent that the relatively reverse faces of the resulting bricks will be unmodified from their usual conventional appearance common to new bricks.

For carrying out such a process in an efficient manner, it has been found possible to make merely minor alterations, primarily by way of auxiliary mechanism, to conventional brick making machinery. Such auxiliary mechanism consists simply of means for applying over the upper face of an extruded clay column enroute to a cutter, an overlay consisting of one or more layers of paper or other flexible and tearable material, and causing same to move with the column beneath a usual wire type cutter which operates on the column of clay with its overlay while the column of clay is still in its plastic condition, thereby to draw the overlay partially downwardly into the several cuts in the column before the overlay is parted, in order to achieve the desired result.

To promote an understanding of the invention, reference will now be made to the process as carried out by a specific and preferred embodiment of mechanism as illustrated in the accompanying drawing, and specific language will be used to describe same. It will nevertheless be appreciated that no limitation of the scope of the invention is thereby intended, and that such further modifications and alterations, both of the mechanism and process, are contemplated as would normally occur to one skilled in the art to which the present invention relates.

In the accompanying drawing:

FIGURE 1 represents a diagrammatic perspective view showing how conventional brickmaking mechanism, modified in accordance with the present invention, is employed in carrying out the process of the invention.

FIGURE 2 is a diagrammatic elevational view of the cutter prior to its cutting action on a clay column having thereon the paper overlay in accordance with the preferred embodiment of the invention.

FIGURE 3 is an enlarged fragmentary elevation of the bricks immediately after passing through the cutter.

Referring now in detail to the accompanying drawing, a horizontal column of plastic clay C is continuously extruded in usual manner from a conventional extrusion machine, of which the extrusion spout or orifice defining portion 10 only is shown.

As this plastic column is extruded, it is received and supported on the upper horizontal run of a usual flexible endless conveyor 12 which is supported in usual manner around rollers of which but one, namely the roller 14 is illustrated, it being apparent that the conveyor will comprise a further roller (not shown) carried at the other extremity of its rigid frame 16 for rotation.

The conveyor 12 is driven in accordance with usual practice in such manner that its upper run moves with the clay column at the speed of extrusion to provide support and guidance for the clay column as the latter is moved into a conventional cutter mechanism, identified in its entirety by the numeral 18. Such a mechanism again may be of purely conventional type comprising a rotary frame having a plurality of series of relatively aligned and parallel cutting wires such as 20 disposed for operative movement transversely to and across the plastic clay column for cutting action in a direction generally downwardly as seen in FIGURE 1. The cutter 18 is merely representative of a well-known rotary reel type cutter which moves intermittently with the column of clay during the cutting operation so that the cut will be perfectly perpendicular to the clay column, all as is more fully disclosed in the U.S. Patent to Hawk 2,261,114.

The mechanism thus far described, including both the individual components and the mode of cooperation thereof, is well known in the art and apart from the improvements hereinafter described, is not claimed as new.

In order to adapt such a mechanism for use in carrying out the new process there are provided means for rotatably supporting one or more rolls of paper 22 and 24 respectively, over the clay column C with their rotational axes horizontal and transverse to the movement of the clay column. Such supporting means is shown schematically as exemplified by the standards or brackets 26 and 28 respectively, supported by and projecting vertically upwardly from the rigid frame member 16 and rotatably supporting cross shafts 30 and 32 respectively, for supporting and defining the rotational axes of the respective paper rolls 22 and 24.

A free end portion of the paper extending from the roll 22 is drawn over and layed on the upper surface of the clay column C and is pressed against and thus held in frictional engagement with the column by a pressure roll 34 rotatably supported between the free ends of arms 36 swingably supported at 38 from the upstanding or perpendicular standards 40 carried by the frame member 16.

Thus the end portion of paper extending from the roll 22 forms an overlay 42 on the flat upper face of the plastic clay column C for movement with the column into the cutter 18. Similarly the free end portion 44 from the paper roll 24 is drawn by the movement of the clay column beneath the pressure roll 34 to form a second layer of the resulting paper overlay on the column, though it is not necessary that such a second layer be employed, it being intended that layers or thicknesses of paper will be employed in such number as required to obtain the desired degree of decorative effect.

After the column of plastic clay, while still in its plastic state, is positioned beneath the cutter 18, the latter is operated to move a series of the cutter wires 20 downwardly transversely through the column and its paper overlay. By virtue of the fact that the wires are not provided with sharpened cutting edges, but merely constitute comparatively blunt cutting implements, they will not immediately sever the paper, but as illustrated in FIGURE 3 will tend to drag the paper down at least partially into the cuts made by the wires in passing through the column of clay. The paper will thus be pulled into the cuts to a degree which will vary in accordance with the thickness, tensile strength and flexibility of the paper before the paper is eventually parted by the wires, thereby resulting in an irregular rounding and distortion along the edges of the cuts to provide the desired decorative or old brick appearance of the upwardly presented face of the brick.

It will be observed in FIGURE 3 that this decorative effect is restricted to the upwardly presented face portion of the brick B, whereas the lower face will be unmodified and will resemble the corresponding face of usual new bricks as made by conventional processes.

Obviously such a brick, at the option of the bricklayer may be layed to present either of these faces outwardly for presentation on the exterior of a given structure so that the structure may be made to appear optionally either as formed of old brick or of new brick.

Moreover it will be readily apparent that any of a number of coatings of various types of material may be applied to the clay column as it is extruded from the brick machine, exemplified by the extrusion spout 10, and before the column has the paper overlay 42, 44 applied thereto, all to the end that the brick faces may be given various colors and textures.

In this invention there is shown and described only the preferred embodiment of the machinery as well as the resulting article, simply by way of illustration of the preferred mode of practicing the invention. However, it is recognized that the invention in each of its several aspects is capable of other and different embodiments and may be modified in various ways within the scope of the appended claims without departing from the invention.

Having thus described my invention, I claim:

1. In a brickmaking machine of the class comprising an extrusion head for continuously extruding a horizontal plastic clay column of rectangular cross section onto a conveyor for delivery to an intermittently operating cutter having a plurality of relatively parallel blunt edged cutting implements for passage downwardly transversely through the column while the latter is still in its plastic condition to divide same into a plurality of bricks, the improvement comprising means for rotatably supporting a roll of paper over said clay column, means for pressing a free end portion of paper from said roll against the flat upper face of the column and in registry therewith for movement with the column over said conveyor and into the cutter, to be engaged and drawn partially into the clay column by the cutter elements during operation of the cutter, thereby causing the edges of the resulting upwardly presented brick faces to be irregularly rounded and distorted to simulate the appearance of old brick.

2. In a brickmaking machine of the class which includes an extrusion head for continuously extruding a horizontal plastic clay column of rectangular cross section onto a conveyor for delivery to an intermittently operating cutter having a plurality of parallel tensioned wires for passage downwardly transversely through the column while still in its plastic condition to subdivide it into a plurality of bricks, the improvement comprising means for continuously applying over the flat upwardly presented face of said plastic clay column enroute to the cutter an overlay of flexible tearable material, and means for pressing said material against the clay column for movement therewith into the cutter, to be engaged and drawn partially into the clay column by the cutter wires during operation of the cutter.

3. In a brickmaking machine of the class in which an extruded column of plastic clay is moved into and through an intermittently operating cutter having a dull cutting element for passage downwardly through the column to divide it into a plurality of bricks, the improvement comprising means for continuously applying a strip of paper over the flat upper surface of said clay column while the latter is enroute to the cutter, to be engaged and drawn into the clay column by the cutter element during operation of the cutter and prior to severing of the paper, thereby causing the corners and edges of the column adjoining the respective cuts to be irregularly rounded and distorted.

4. In a brickmaking machine as defined in claim 3, in which said means for applying the strip of paper comprises a roll of said paper, and means rotatably supporting said roll over the clay column for rotation about a horizontal axis disposed transversely to the movement of said column.

5. The combination defined in claim 4, including means for pressing a free end of paper from said roll against the flat upper surface of the column for movement with the column into the cutter.

6. The combination defined in claim 5, in which said cutter element comprises a tensioned wire.

7. The process of forming decorative bricks comprising the steps of continuously extruding a horizontal plastic clay column of rectangular cross section, applying over and against one flat face of said column an overlay of flexible and tearable sheet material, then with the column still in its plastic state, severing said column into a plurality of bricks by pressing a series of parallel blunt cutting elements transversely through said overlay in a direction to first engage said overlay and then to drag it partially into and through the column before parting of the overlay, whereby to irregularly round and deform the edges of the resulting bricks around the brick faces comprised by segments of said flat face of the column.

8. The process of forming decorative bricks comprising the steps of forming a horizontal elongated plastic clay column of rectangular cross section having relatively parallel upper and lower flat faces, supporting said column on a horizontal flat surface with its said lower flat face resting on said surface, applying over said upper flat face only of the column an overlay of flexible tearable sheet material, then while the column is still in its plastic state, severing said column into a plurality of bricks by a series of continuous movements of an elongated cutting wire completely through the column transversely thereto and to the elongated wire and in a direction to first engage said overlay and to drag it partially into and through the column whereby to irregularly round and form the edges of the column on opposite sides of the path of said wire, then completely severing said sheet material at a location medially of the thickness of the elongated column between its said upper and lower flat faces and thereafter continuing the movement of the said wire to and through said lower flat face without substantially deforming same adjacent the edges of the cut.

References Cited by the Examiner

UNITED STATES PATENTS

| | | | |
|---|---|---|---|
| 1,613,567 | 1/1927 | Ogden | 264—148 |
| 1,981,265 | 11/1934 | Forry | 25—109 |
| 2,132,257 | 10/1938 | Dunskey | 50—270 |
| 2,261,114 | 11/1941 | Hawk | 25—109 |
| 2,482,339 | 9/1949 | Hibbard et al. | 50—270 |
| 2,633,441 | 3/1953 | Buttress | 25—105 XR |
| 3,073,304 | 1/1963 | Schaar | 264—156 |
| 3,183,286 | 5/1965 | Harms | 264—271 |

ROBERT F. WHITE, *Primary Examiner.*

S. A. HELLER, *Assistant Examiner.*